UNITED STATES PATENT OFFICE.

WILLIAM MORRISON, OF CHICAGO, ILLINOIS, ASSIGNOR OF ONE-THIRD TO M. A. LUMBARD, OF DES MOINES, IOWA.

SECONDARY BATTERY.

945,243.     Specification of Letters Patent.     Patented Jan. 4, 1910.

Application filed June 20, 1902, Serial No. 112,472. Renewed May 22, 1909. Serial No. 497,714.

*To all whom it may concern:*

Be it known that I, WILLIAM MORRISON, a citizen of the United States of America, and resident of the city of Chicago, county of Cook, State of Illinois, have invented a certain new and useful Improvement in Secondary Batteries, of which the following is a specification.

My invention relates to electric accumulators or secondary batteries of that type in which the negative and positive elements are immersed in an alkaline solution containing zinc, and commonly called zincate of potash or soda.

In charging, the zinc in the solution is deposited upon the positive element, and during the discharge of the battery the zinc then leaves the positive element and returns to the solution, this process being repeated in the continued charge and discharge.

The principal object of my invention is to provide means for more effectively preventing local action, and thus provide a battery which may be allowed to remain on open circuit for a considerable length of time. In batteries of this type, the zinc of the solution is deposited, by electrolysis, upon a metal support. It is essential that this support should have as little weight as possible, and should be of maximum rigidity and strength. To prevent local action between the metal support and the deposited zinc it has been the custom to amalgamate this metal support. But the metal of the support must not only be rigid and light, but it must also be capable of practically preventing the mercury from penetrating beyond its subjacent surface, or, in other words, from penetrating into its interior mass, because should the mercury thus penetrate into the interior mass it will render the support brittle and thus make it liable to break and destroy its capacity to resist buckling. When, however, the mercury is amalgamated upon the surface of the metal support, it will not remain uniformly upon the surface in the discharge, but tends to run off the support, leaving the whole, or parts, of the surface of the support exposed to the solution. Therefore to provide a more complete and efficient means for uniformly and securely holding the amalgam upon the entire surface of the support, fixedly, uniformly and securely, to more completely prevent local action, some extremely porous, or absorptive, substance must be coated over, or upon, the surface of the support, which covering should be capable of absorbing, or taking up into its mass, a large quantity of the mercury. This porous coating, upon the surface of the support, must not only be capable of taking up, or absorbing into its mass, a large quantity of the mercury, but it must also be of low potential relative to the zinc, that is, the difference of potential between the material constituting the absorptive and amalgam-holding coating of the zinc, must be slight, or as small as possible. And finally both the support, and particularly the amalgam-holding coating, should be relatively insoluble in the solution.

I have found in practice that copper provides a good material for the support, and I prefer to use it; but iron or nickel may be used, or in fact any metal which will not permit the penetration of the mercury to any material degree may be used, provided it is practically insoluble in the solution and has sufficient rigidity. For instance, brass is not a good material for a support because it is composed of an alloy of zinc and copper and the mercury penetrates beyond the subjacent surface of its mass rendering it brittle.

For the amalgam-holding or absorptive coating after practical experience, I have ascertained that cadmium is admirably adapted for the purpose. This cadmium is capable of absorbing and taking up uniformly and into and through the body of its mass, a relatively large quantity of mercury, and when the cadmium containing the mercury is coated over and upon the surface of the support, the cadmium firmly and securely binds and holds the mercury upon the support, thereby preventing the mercury from running off the support and providing means for more effectively preventing local action between the support and the zinc, and as the support is of a character to prevent the penetration of the mercury its strength is not diminished. That local action is more effectively prevented is evident because the zinc is deposited upon a coating of cadmium, thoroughly assimilated with mercury, and the material of the coating is thus completely amalgamated. It is obvious that the cadmium itself cannot be used as a support, because of its capacity to readily absorb the mercury into its interior mass. This penetration and assimilation of the mercury renders the cadmium too brittle for use as a support.

Cadmium is further adapted for the purpose of a coating, as it is relatively insoluble in the solution and, finally, as the difference of potential between it and zinc is relatively slight, but little, if any local action is set up between the cadmium coating and the zinc deposited thereon.

In carrying out my invention I provide negative and positive elements, and immerse them in zincate of potash or soda solution. The negative element can be of any suitable known or approved substance. The positive element, however, consists preferably of a foraminous or perforated or woven copper support having a coating of cadmium or cadmium and mercury, although a support having a plain surface may be employed if desired. In preparing the positive element the cadmium can be first applied to this support and the mercury can then be applied to the coating of cadmium, or both can be applied together. I have found it best to deposit the cadmium on the support by electrolysis. And the mercury may also be applied in this way. And this may be done by providing a suitable anode, and a copper support as a cathode, immersed in a saturated solution of sulfate of cadmium, and during the passage of a suitable electric current, the cadmium will be electrolytically deposited upon the support. It will be understood, however, that the cadmium or the mercury, can be applied to the support in any suitable manner, either in two separate coatings or together.

I claim—

1. In a secondary battery, an electrolyte of alkaline zincate, a support coated with cadmium upon which support the zinc of the electrolyte is to be deposited and a suitable negative electrode.

2. In a secondary battery, an electrolyte of alkaline zincate, a support coated with cadmium and mercury upon which support the zinc of the electrolyte is to be deposited and a suitable negative electrode.

3. In a secondary battery, the combination of a support coated with cadmium and mercury, and a zinc deposit on said coating.

4. In a secondary battery, the combination of a support coated with cadmium and mercury, an electrolyte containing zinc, and a suitable negative electrode.

Signed by me at Chicago Illinois this 18th day of June 1902.

WILLIAM MORRISON.

Witnesses:
   CHAS C. BULKLEY,
   WM. A. HARDERS.